United States Patent [19]

Murray, Jr.

[11] Patent Number: 4,928,401
[45] Date of Patent: May 29, 1990

[54] SHAFT ALIGNMENT SYSTEM

[76] Inventor: Malcolm G. Murray, Jr., 220 E. Texas Ave., Baytown, Tex. 77520

[21] Appl. No.: 292,923

[22] Filed: Jan. 3, 1989

[51] Int. Cl.$^5$ .............................................. G01B 5/25
[52] U.S. Cl. ........................................ 33/645; 33/412
[58] Field of Search ................. 33/412, 286, 645, 657, 33/661, 533, 550

[56] References Cited

U.S. PATENT DOCUMENTS

| | | |
|---|---|---|
| 4,033,042 | 7/1977 | Bently . |
| 4,102,052 | 7/1978 | Bloch . |
| 4,428,126 | 1/1984 | Banks . |
| 4,516,328 | 5/1985 | Massey . |
| 4,586,264 | 5/1980 | Zatezalo . |

Primary Examiner—Harry N. Haroian
Attorney, Agent, or Firm—King & Schickli

[57] ABSTRACT

A shaft alignment system is disclosed to facilitate obtaining alignment measurement data on coupled rotating shaft machinery. The system includes one or more alignment scales which are mounted for relative sliding movement across the shaft coupling. The alignment scales include cooperating true and Vernier scale components for highly precise measurements with readings to an accuracy of 0.001" or 0.01 mm. This allows both axial displacement and parallel and angular misalignment to be checked and corrected. The system can be used on many different couplings, such as disc-type and diaphragm-type, flexible couplings. The alignment scales are mounted on U-shaped bases with the distal end of the true scale being held captive in the lateral direction within the Vernier scale base so as to stabilize against wind induced fluttering and vibration. Cold alignment checks may be taken first and then the machinery is brought up to speed, allowed to stabilize thermally, and a stroboscopic light source synchronized to the shaft speed to illuminate the scales. The scales are read at the desired relative positions according to standard alignment techniques.

10 Claims, 2 Drawing Sheets

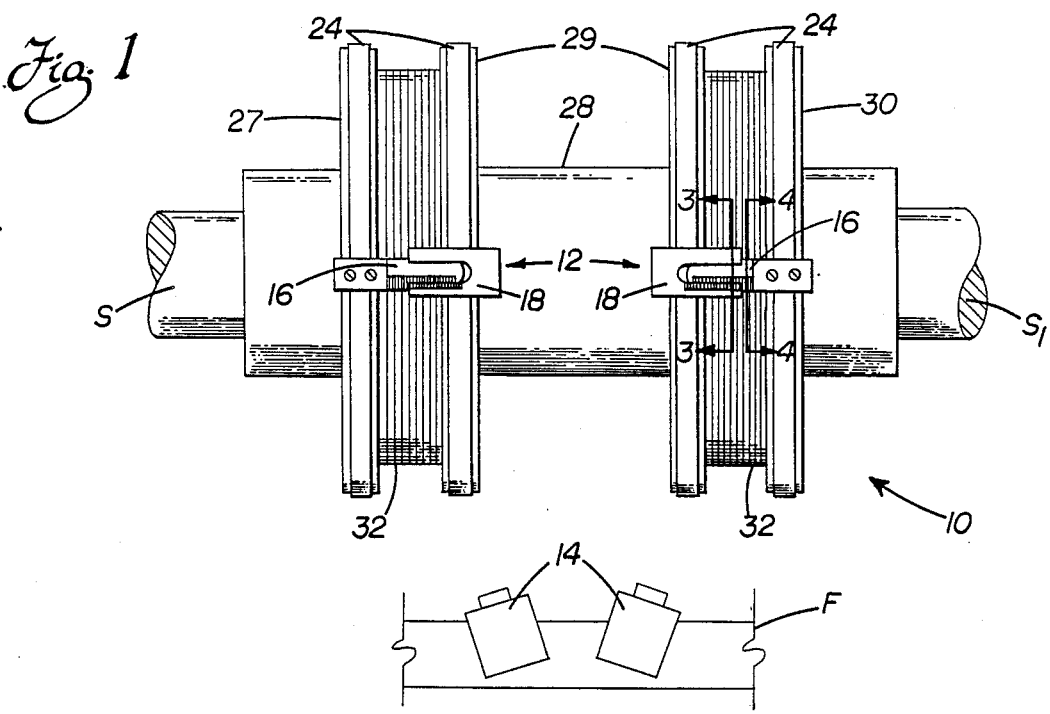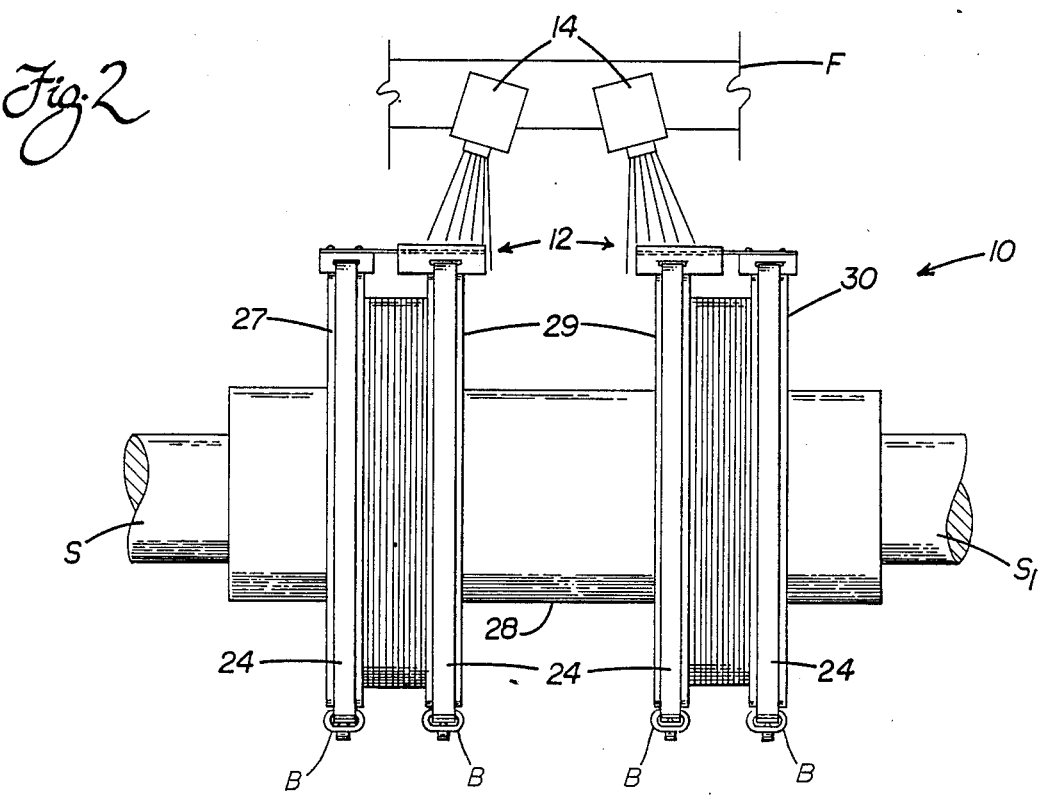

SHAFT ALIGNMENT SYSTEM

TECHNICAL FIELD

The present invention relates generally to an alignment system for rotating machinery and, more particularly, to a system utilizing Vernier-type alignment scales in combination with a stroboscopic light source to obtain running or "hot" alignment data.

BACKGROUND OF THE INVENTION

The necessity for accurate alignment of rotating shaft machinery is well known. More specifically, in order to assure maximum output and machinery longevity, accurate alignment between driving and driven components is essential. As is known in the art, if a coupling is set for perfect alignment in the "cold" (non-running) condition, the machinery will often "grow" out of this true alignment as operating temperatures change. This can lead to higher vibration levels, or even shaft misalignment severe enough to potentially result in catastrophic failure.

In order to compensate for this phenomenon, in the past cold alignment figures to which the machinery is initially set in the field may include an offset to account for relative anticipated thermal expansion or contraction. The machinery can be set out of alignment by a predetermined amount, for example, and then during operation, grow into true alignment. Often however accurate cold alignment offset figures are not available, leaving the field technician the responsibility of accurately aligning the rotating components without any guidelines for compensation. This necessarily leads to inaccuracies and possibly even machine failure. Obviously, this is unacceptable due to the possible safety hazard, damage to the machinery and of the related down time.

A variety of shaft alignment systems/techniques have been developed to date. U.S. Pat. No. 4,102,052 to Bloch discloses an apparatus for determining axial displacement or deflection of a rotating shaft or coupling, allowing compensation for shaft axial growth. A calibrated deflection decal is affixed to the coupling shaft and zeroed at some convenient point, such as the coupling guard of a standard diaphragm-type coupling. The machine is placed into service and axial deflection of the shaft is determined by reading the decal with the aid of a speed synchronized strobe light. While use of this system has proved generally effective, it provides only data of sufficient precision to aid in correcting axial displacement. This system does not address the problem of obtaining accurate enough data to correct parallel and angular misalignment, and as such is only of limited effectiveness.

U.S. Pat. No. 4,428,126 to Banks discloses an apparatus for monitoring shaft alignment utilizing a bar or other mounting means attached to the component casings. Eddy current proximity probes are utilized to obtain data which can be converted into linear alignment change figures. U.S. Pat. No. 3,783,522 to Dodd uses proximity probes mounted somewhat differently, to accomplish the same thing, i.e., measurement of alignment change. Neither system measures the basic parallel and angular alignment condition, both depending on getting this separately by other means. Also, both are subject to error due to radial growth which may occur on the machine/bearing housing to which they are mounted, in proportion to the distance of such surface from the shaft centerline. Use of this type probe system increases complexity, and can lead to inaccuracies due to the indirect method of obtaining the alignment figures.

U.S. Pat. No. 4,516,328 to Massey discloses a shaft alignment device including a relatively complicated framework. Such a device cannot be used to obtain running or hot alignment data. Similarly, U.S. Pat. No. 4,586,264 to Zatezalo discloses a shaft alignment device utilizing oppositely mounted split flanges spaced a distance from the center coupling. Oppositely mounted dial indicators are set to read radial run-out data from one flange to the other. Here again, the apparatus does not lend itself to accurate running checks.

U.S. Pat. Nos. 4,033,042 and 4,148,013 to Bently and Finn, respectively, show eddy current proximity probe systems which effectively measure running angular and parallel alignment of one machine relative to another to which it is flexibly coupled, using shaft centerline relationships. This is ideal from a mathematical standpoint, but the systems are complex, expensive, and difficult to retrofit to existing machines.

A need exists therefore, for a shaft alignment system designed to be simply installed and which can be utilized to provide both hot and cold alignment data and covering axial displacement and both angular and parallel misalignment. Such a device would be simple to install and operate, and yet provide highly accurate data results.

SUMMARY OF THE INVENTION

It is therefore a primary object of the present invention to provide a shaft alignment system overcoming the limitations and disadvantages of the prior art.

Another object of the present invention is to provide a shaft alignment system utilizing a strobe light to obtain accurate alignment measurements of rotating shaft machinery.

Yet another object of the present invention is to provide a strobe shaft alignment system which is economical, reliable and easy to install on rotating shaft machinery couplings, and yet does not substantially interfere with machinery operation.

Still another object of the present invention is to provide a strobe shaft alignment system which is readily adaptable to a wide variety of couplings in use today.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a strobe shaft alignment system is utilized to obtain shaft alignment measurements of coupled machinery components, such as an electric motor driving a centrifugal pump. The system can be utilized on running machinery to provide hot alignment measurements, as well as cold (non-running) checks. For the latter, the strobe light is not used.

The preferred embodiment of the shaft alignment system selected to illustrate the invention includes one or more alignment scales mounted across a flexible coupling. The system is readily adaptable to flexible couplings such as the type utilizing metal discs, diaphragms or the like. Such couplings normally utilize two flexing elements held between flanged hubs, connected by a spacer tube. The two-element scales are used in pairs. One component of each scale is mounted on the driving and driven machinery shaft or coupling hub or flange, and the other at each end of the spacer tube or its end hub or flange. Advantageously, the system is simple to install, and is therefore easy to retrofit on existing machinery.

A stroboscopic light source is utilized to provide illumination for reading the scales when the machinery is operating up to speed. The strobe light is synchronized to shaft speed and then directed at the coupling at the desired reading locations. In this way, the scale reading at that point is "frozen" and may be read directly by the operator. This is analagous to the well known use of a timing light to read automobile ignition timing while the engine is running.

The alignment scale comprises separate true and Vernier scale components cooperating in a sliding relationship. In the preferred embodiment, the scale can be read to an accuracy of 0.001" (1 mil.) or 0.01 mm. This provides substantially greater precision than the standard generally followed in the industry utilizing simple mechanical scale measurement systems, such as illustrated in the Bloch patent. The true and Vernier scale components each have an inverted U-shaped mounting base securely retained on the machinery by mounting straps passing through cooperating slots in the channel-shaped bases and around a coupling flange, auxiliary collar or the like. The straps are then tightened to securely position the scale components and further secured by a locking buckle for each strap. Other mounting methods, such as screws inserted into threaded holes, could also be used.

The true scale extends across the span of the coupling and the distal end is held captive against lateral movement in the inverted U-shaped base supporting the Vernier scale. The true scale is protected from fluttering due to wind generated as the coupling rotates at operating speed. The centrifugal force snugly holds and steadies the true scale against the upper inside surface of vernier scale base and brings the indicia of the two scales into snug juxtapostion. The Vernier scale indicia are on a tapered face of a cut-out opening in the base to further enhance the high precision read-out.

For greater ease of reading rightside up from any vantage point, matching dual scale pairs may be used; one scale pair inverted with respect to the other, and all indicia on the same matched sliding scale and U-shaped base. A second taper, opposite the first, would be required for this embodiment.

Advantageously, the compact size of the alignment scales facilitates mounting in areas of limited space. This allows the machinery to be run with coupling guards or the like in place, if necessary, without substantially inhibiting machinery operation or use of the alignment system.

The alignment scale is relatively light in weight, being fabricated primarily of aluminum. The true scale component is made of stainless steel for greater strength and durability. The placement of the alignment scale on the machinery therefore usually has a negligible effect on machinery operation. However, suitable counter weights can be placed 180° out of phase with the scale, if necessary, to offset any unbalanced mass effects which could increase vibration, for example.

In order to accurately align the machine components, the operator takes readings at at least three relative angular positions, for each of the two sets of scales. Additionally, the operator takes fixed geometric measurements including the axial distance between coupling flex planes and distance back to the correction planes at inboard and outboard machine feet. The effective rotation diameter at the scales is also needed. For convenience, the scale readings are typically taken at the top of the coupling (0°), the right side of the coupling (90°) and the left side of the coupling (270°). From these readings, taken both at cold and stabilized hot running conditions, the axial displacement and relative parallel and angular misalignment of the two machinery components can be calculated and suitable cold offsets determined. The precise measurements within 0.001 inch or 0.01 mm that are possible allow correction of all conditions, whereas previously only axial displacement correction could reliably be made, as noted earlier with reference to U.S. Pat. No. 4,102,052 to Bloch.

The arithmetic processes involved in the above calculation and the manner of systematic repetition of the process are well known in the alignment art and do not form a part of the present invention. A fourth or bottom reading is optional and is generally taken to check the accuracy of the readings, if ready access is available to read the scales in the bottom position. Often this access is insufficient, however, so in such cases the bottom position readings are solved for algebraically, using the top and two side readings. The readings can be taken directly by the operator if an open-mesh or window-equipped coupling guard is used, or through a borescope to facilitate remote readings. Operating the machine with coupling guard removed, is hazardous and should not be attempted. If necessary, illumination of the remote reading site may be provided by light transmitted through a fiber optic cable. Additionally, it is possible to take photographs of the scale readings while the machinery is in operation to preserve the result, or further enhance the accuracy of the readings.

Advantageously, the shaft alignment system of the present invention is readily adaptable to a wide variety of couplings available in the market today. For example, the shaft alignment system has been successfully used on various metal disc type couplings such as Thomas, Metastream and Formsprag. It would also be easy to apply to flexible diaphragm type couplings such as Bendix, Kop-Flex (formerly Koppers) and Zurn. Generally, the true and Vernier scale components are simply mounted on available coupling flanges. If this method of mounting does not prove satisfactory, other mounting means, such as an auxiliary mounting collar including split flanges bolted together around an available portion of shaft and coupling spacer can be utilized with an equal degree of precision.

In an alternative embodiment, the true scale component can be simply mounted on the diaphragm guard of the diaphragm type coupling. The Vernier scale is then mounted directly on the spacer tube with the distal end of the true scale securely held in the inverted U-shaped base to assure the high precision reading necessary for correcting both axial displacement and parallel misalignment. The true scale can be attached with screws or simply by an appropriate adhesive. The variety of ways the scales can be attached is a distinct advantage to the operator, allowing the system of the present invention to be used in a wide variety of situations and applications.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 1 is a top elevational view of the shaft alignment system of the present invention shown mounted across a metal disc type flexible coupling;

FIG. 2 is a side elevational view of the shaft alignment system of the present invention mounted on the same coupling as in FIG. 1;

Reference will now be made in detail to the present preferred embodiment of the invention, an example of which is illustrated in the accompanying drawing.

DETAILED DESCRIPTION OF THE INVENTION

Reference is now made to FIGS. 1 and 2 showing the shaft alignment system 10 of the present invention. The system can be used for acquiring cold alignment data, as well as hot or running data acquisition on coupled, rotating machinery. Advantageously, the system 10 is suitable for use on a wide variety of couplings.

As shown in FIG. 1, the shaft alignment system 10 of the present invention includes two alignment scales 12. A stroboscopic light 14 is provided to direct synchronized flashes of light for reading the scales 12 when the machinery is running. As shown in the preferred embodiment, two strobe lights 14 are temporarily mounted to a frame or base F of the machinery. It should be pointed out, however, that a single strobe light 14 may simply be manually held, if desired, and moved from place to place as needed. This flexibility allows for easier utilization of the system on different types of rotating shaft machinery, as well as facilitating working around protective structures, such as shaft/coupling guards and the like.

Figure 3:
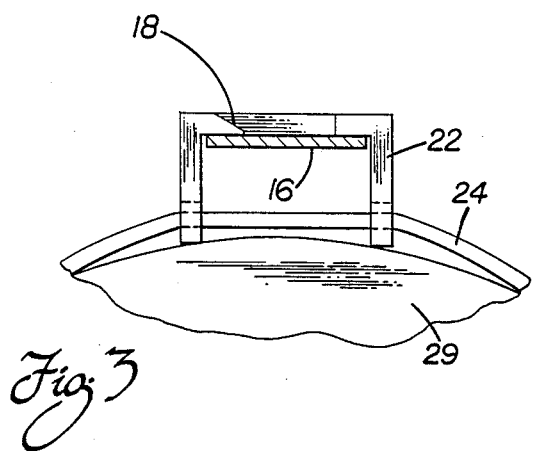
FIG. 3 is a partial cutaway view taken along section line 3—3 of FIG. 1.
Figure 5:
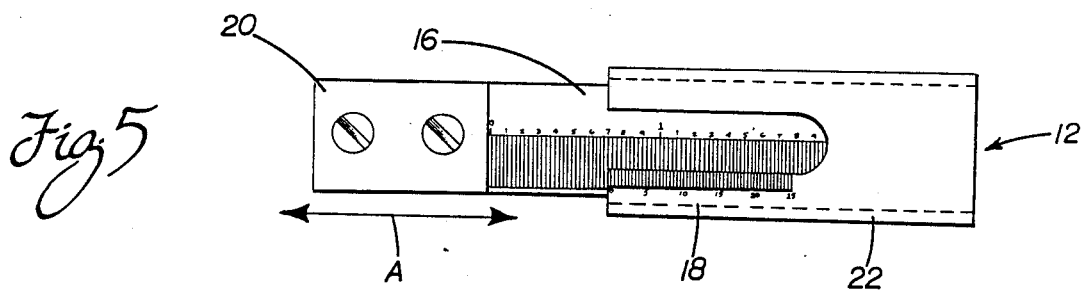
FIG. 5 is a plan view in greater detail of an alignment scale used in the present invention.

As best illustrated in FIGS. 1 and 5, the alignment scale 12 includes a true scale component 16 and a Vernier scale component 18. The scale components 16 and 18 are appropriately calibrated to read to an accuracy of 0.001" (1 mil.) or 0.01 mm. As shown by the action arrow A in FIG. 5, the true scale component 16 and Vernier scale component 18 cooperate in a sliding relationship. Advantageously, this axial sliding relationship permits substantially free motion for precise measuring action between the two scale components. This freedom of movement is particularly important during the hot running checks when shaft speeds can become quite high. As shown in FIG. 3, the distal end of the true scale component 16 slides underneath the Vernier scale component 18. At speed, the true scale component 16 tends to fling outwardly by centrifugal force. As a result, the true scale component 16 is pressed against the underneath of the vernier scale component 18, advantageously enhancing accuracy.

Figure 4:
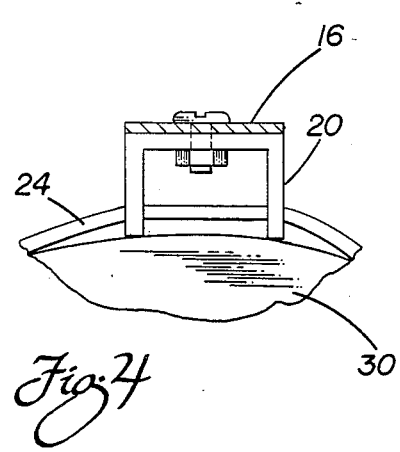
FIG. 4 is a partial cross sectional view taken along section line 4—4 of FIG. 1.

As further shown in FIGS. 3 and 4, the true and Vernier scale components 16, 18 each have inverted U-shaped mounting bases 20 and 22, respectively. In the preferred embodiment, the bases 20, 22 are fabricated of extruded aluminum channel so as to be lightweight and providing stable two-line-contact mounting on the periphery of the corresponding coupling flange. The true scale component 16 is fabricated of stainless steel for durability, is a relatively thin 0.005" and, therefore is relatively lightweight as well. The Vernier scale component is on a tapered face of a cut-out opening in the base 22. Since the distal end of the true scale component 16 is held snugly against lateral movement inside the base 22, it is stabilized and protected from fluttering due to the wind generated by rotation of the machinery and from vibration of the machinery. Thus, a precise, highly accurate reading can be taken in the hot running mode. The scales can be etched onto the metal, or applied as metal, paper, or plastic prints attached adhesively.

Figure 7:
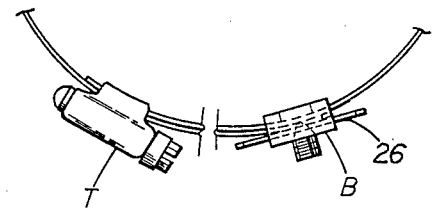
FIG. 7 is an enlarged fragmentary view of the tensioning strap utilized in the shaft alignment system of the present invention showing a tensioning lug and locking buckle mounted on the strap.

The true and Vernier scale components 16, 18 are securely retained on the machinery by mounting tensioning straps 24 passing through cooperating slots in the bases 20, 22 and around the coupling flange, auxiliary collar or the like. The straps 24 are then tightened to securely position the scale components by a tensioning lug T as shown in FIG. 7. As is well known in the art, the tensioning lug T includes an internal worm gear which engages corresponding slots (not shown) in the strap 24. The desired tension is obtained by simply tightening the slotted head of the worm gear by the use of a screwdriver or the like. As additionally shown in FIG. 7, a locking buckle B is also provided to further secure the strap 24. The buckle B is securely held in position by a set screw. Other mounting methods, for example screws in tapped holes, could be used instead, if desired.

Being relatively lightweight, the alignment scale 12 usually has a negligible dynamic effect on the large scale rotating machinery. However, and as shown in FIG. 7, suitable counterweights 26 can be installed within the buckle B mounted opposite the scale 12 to negate any possible unbalanced mass effects. Advantageously, and as shown in FIG. 7, the counterweight 26 is securely retained by the set screw. Thus, the counterweight 26 is positively retained within the buckle B and yet is easily installed or removed by simply releasing the set screw. Generally, the counterweight 26 is of small magnitude, since the tensioning lug T and locking buckle B located 180° from the scales, will provide most of the required counterweighting.

Advantageously, the shaft alignment system 10 of the present invention is readily adaptable to a wide variety of couplings used in the market today. For example, FIGS. 1 and 2 illustrate the system mounted on a flexible metal disc type coupling. This coupling includes a driving flange 27 on driving shaft S, spacer tube 28, including intermediate flanges 29, driven flange 30 on driven shaft S' and metal disc packs 32. As is known in the art, the metal disc packs 32 transfer torque by flexing and shifting when the machine components are axially displaced and/or parallel and/or angularly misaligned. As the system of the present invention is used, the driving/driven shafts S, S' of the machinery are moved to achieve more perfect alignment during the running mode to thereby minimize displacement/misalignment. The desired end result is of course smooth, low vibration operation and extended machinery life.

As shown in FIGS. 1 and 2, installation of the alignment scale 12 involves mounting the bases 20, 22 on the various flanges 27, 29 and 30 of the coupling. Alternatively, if the above flanges are not suitable, an auxiliary mounting collar including split flanges and simulating the flange (not shown) may be placed at some convenient point to facilitate mounting of the alignment scales 12. The mounting of the strobe lights 14 is left up to the operator and depends on machine configuration and operator preference. Much will depend on the design of the coupling guard (not shown), whether open mesh, solid with viewing cutouts, or solid requiring viewing and illumination access by means of borescope, fiberoptic cable, or the like. Operating without the coupling guard, shown for convenience in our illustrations, is not advisable due to the hazard created.

Figure 6:
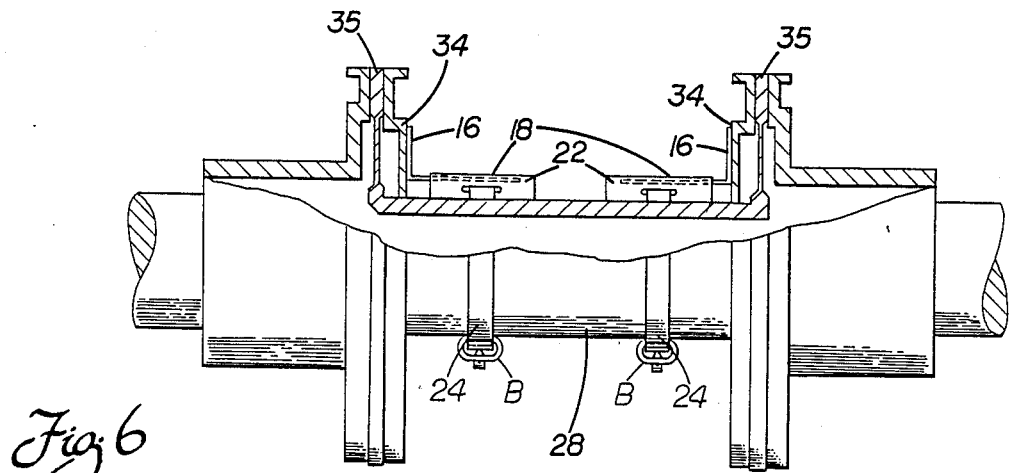
FIG. 6 is a partial cross sectional view of the shaft alignment system of the present invention shown mounted on a flexible diaphragm type coupling.

In an alternative embodiment, the true scale component 16 may be L-shaped and one leg mounted directly to diaphragm guard 34 of flange 35 on diaphragm-type coupling, (see FIG. 6). Attachment to the guard can be by screws or simply an appropriate adhesive. The distal end along the other leg of the L fits inside and is protected by the U-shaped base 22 having the Vernier scale 18.

In order to align the shafts S, S' of the machinery, the operator installs the above components while the machinery is shut down. Cold alignment checks using the alignment system 10 may be taken at this time. The relationship between the scale components 16, 18 of the scale 12 are read in each of the three (or four or more) positions and data recorded. The reading is made in a highly precise manner, and indeed to within about 0.001 inch or 0.01 mm by utilizing the Vernier scale component 18. The need for use of separate dial indicators as in the past for this measurement is obviated. The true scale may have to be held manually against the Vernier scale, since running centrifugal force will be absent. If desired, cold readings could also be taken independently by other means, such as dial indicators or laser, with such equipment being removed prior to running the machinery.

The drive shaft S of the machinery is now rotated to turn the driven shaft S' of the machinery. It is allowed to continue to run for a sufficient period of time to assure that the components are at operating temperature. The operator synchronizes the strobe light 14 to the shaft speed and takes data readings at least three relative angular positions. For convenience, these readings are typically taken at the top of the coupling (0°, see FIG. 1), the right side of the coupling (90°) and the left side of the coupling (270°). From these readings, the relative axial displacement and parallel and angular misalignment of the two shafts S, S' can be calculated. The highly precise readings that are attainable allows both conditions to be corrected. A fourth reading (180°) is optional and is generally taken to check the accuracy of the other readings, if access permits.

The arithmetic processes involved in the above calculations, including the calculations to obtain the cold offset figures are well known in the alignment art and do not form a part of the present invention. Advantageously, the system 10 can now be utilized to assist the operator to accurately set the machinery in the cold condition to implement the offsets so that the driving/driven shafts S, S' shift into a more perfectly aligned status, as desired. If necessary, an additional hot running check can be made and further cold offsets made to gain even more precise alignment.

In summary, numerous benefits result from employing the concepts of the present invention. The strobe shaft alignment system 10 is utilized to obtain all of the shaft displacement/misalignment data necessary to perform a successful shaft alignment operation. The system 10 can be readily adapted to be used in a wide variety of applications and coupling types. As a result, use of the system 10 of the present invention helps through providing more perfectly aligned shafts S, S' to achieve smooth, low vibration running of the machinery. The expected life and reliability of key components, such as bearings, couplings and seals, is greatly extended.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. Apparatus for obtaining rotating alignment data for a driving/driven shaft with a coupling, comprising:
   stroboscopic means for providing timed flashes of light;
   scale means for determining cold and hot running alignment measurements; and
   means for mounting said scale means to the shaft across said coupling so as to be stabilized for accurate hot running measurements;
   said stroboscopic means being synchronized to the shaft speed in order to illuminate said scale means at various relative positions, whereby the desired shaft alignment data can be obtained;
   said scale means including two relatively sliding scale components each including a base member for mounting.

2. The apparatus of claim 1 wherein each said base member is retained on said shaft by tensioning means.

3. The apparatus of claim 2 wherein said tensioning means is a strap passed through each said base member and around the outer perimeter of a flange on said shaft, and means for tightening and securely locking said strap.

4. The apparatus of claim 1 wherein said scale components include a true scale and Vernier scale for highly precise measurements.

5. The apparatus of claim 4 wherein said mounting means includes an inverted, U-shaped base for said scales.

6. The apparatus of claim 5 wherein the distal end of said true scale extends into and is held captive by a U-shaped base of said Vernier scale, whereby the scales are stabilized relative to each other for accurate reading.

7. The apparatus of claim 6 wherein Vernier scale is provided along a tapered face of an opening in said base.

8. The apparatus of claim 5 wherein said coupling is a metal disc coupling with spaced flanges, said U-shaped bases provide stable, two line contact mounting on each flange and a tensioning strap extending around each flange engaging the corresponding base for mounting.

9. The apparatus of claim 6 wherein said coupling is a diaphragm type, said true scale being L-shaped and mounted on the coupling diaphragm guard.

10. Apparatus for obtaining rotating alignment data for a driving/driven shaft with a coupling, comprising:

stroboscopic means for providing timed flashes of light;

scale means for determining cold and hot running alignment measurements; and means for adjustably mounting said scale means to the shaft across said coupling so as to be stabilized for accurate hot running measurements;

said stroboscopic means being synchronized to the shaft speed in order to illuminate said scale means at various relative positions, whereby the desired shaft axial, parallel and angular alignment data can be obtained.

* * * * *